(12) United States Patent
Suda et al.

(10) Patent No.: US 6,531,072 B1
(45) Date of Patent: Mar. 11, 2003

(54) PHOSPHOR

(75) Inventors: Yoriko Suda, Mobara (JP); Kenichi Honda, Mobara (JP); Yoshitaka Sato, Mobara (JP); Hitoshi Toki, Mobara (JP)

(73) Assignee: Futaba Corporation, Mobara (JP)

( * ) Notice: Subject to any disclaimer, the term of this patent is extended or adjusted under 35 U.S.C. 154(b) by 0 days.

(21) Appl. No.: 09/635,062

(22) Filed: Aug. 9, 2000

(30) Foreign Application Priority Data

Aug. 10, 1999 (JP) .......................................... 11-226454

(51) Int. Cl.$^7$ .............................................. C09K 11/06
(52) U.S. Cl. ................... 252/301.4 R; 438/505
(58) Field of Search .................... 252/301.4 R; 438/29, 438/505, 935

(56) References Cited

U.S. PATENT DOCUMENTS 6,303,403 B1 * 10/2001 Sato et al. ..................... 438/29

FOREIGN PATENT DOCUMENTS

JP            41686        8/1976

* cited by examiner

*Primary Examiner*—C. Melissa Koslow
(74) *Attorney, Agent, or Firm*—Breiner & Breiner, L.L.C.

(57) ABSTRACT

A phosphor in the form of a columnar powder capable of exhibiting enhanced luminous efficiency, providing various luminous colors by electron excitation depending on the selection of elements added thereto and having improved life characteristics. The phosphor is made by heating a starting material constituted by a GaN based phosphor material to a temperature equal to or greater than a sublimation temperature thereof. The phosphor thus obtained is represented by $Ga_{1-x}In_xN:A,B$, wherein x is larger than or equal to 0 and smaller than 1 ($0 \leq x < 1$), A is Zn or Mg, and B is Si or Ge.

4 Claims, 4 Drawing Sheets

PHOSPHOR

BACKGROUND OF THE INVENTION

This invention relates to a phosphor wherein a solid solution formed of gallium nitride and indium nitride is doped with a doping material or dopant, and more particularly to a phosphor increased in both luminance characteristics and life characteristics which emits light by electron excitation and exhibits various kinds of luminous colors depending on selection of a starting material.

A phosphor including a matrix made of GaN obtained by subjecting $Ga_2O_3$ to nitriding in an ammonia atmosphere and Cd acting as a dopant is known in the art, as disclosed in Japanese Patent Application Laid-Open Publication No. 41686/1976. However, the phosphor disclosed is not applied to luminescence by electron excitation. This is revealed by the fact that the Japanese publication fails to teach and suggest luminescence of the phosphor by electron excitation.

Nitriding of $Ga_2O_3$ in a nitrogen atmosphere is started from a surface of $Ga_2O_3$. However, an increase in temperature causes $Ga_2O_3$ thus nitrided to be re-oxidized. More particularly, gallium nitride generally tends to release nitrogen therefrom, to thereby be an n-type and highly decreased in resistance, resulting in exhibiting luminescence even when it is not subjected to doping.

Luminescence of gallium nitride is carried out by pair luminescence of a donor (D) and an acceptor (A). Zn, Mg or the like may be used as the acceptor. The donor is a nitrogen defect naturally formed, so that an increase in concentration of the donor by the prior art causes an increase in nitrogen defect in the material, leading to a deterioration in crystallizability or crystallinity of the gallium nitride. Thus, the prior art fails to provide gallium nitride which has the number of donors controlled to a desired level.

The presence of oxygen possibly causes oxidation of gallium nitride. Thus, when $Ga_2O_3$ which is an oxide of gallium is used as the starting material, it is impossible to fully nitride $Ga_2O_3$. Also, even when gallium nitride is obtained, oxygen adversely affects luminescence of gallium nitride, to thereby fail to provide the phosphor with satisfactory quality.

SUMMARY OF THE INVENTION

The present invention has been made in view of the foregoing disadvantage of the prior art.

Accordingly, it is an object of the present intention to provide a phosphor which is capable of being prevented from being adversely affected by oxygen.

It is another object of the present invention to provide a phosphor which is capable of permitting a concentration of a donor to be controlled, to thereby be increased in luminous efficiency.

It is a further object of the present invention to provide a phosphor which is capable of exhibiting various kinds of luminous colors by electron excitation depending on selection of elements added thereto.

It is still another object of the present invention to provide a phosphor which is capable of exhibiting both enhanced luminance characteristics and life characteristics.

In accordance with the present invention, a phosphor in the form of a columnar powder is provided. The phosphor is produced by heating a starting material constituted by a GaN based phosphor material to a temperature equal to or greater than a sublimation temperature thereof and represented by $Ga_{1-x}In_xN:A,B$, wherein x is larger than or equal to 0 and smaller than 1 ($0 \leq x < 1$), A is selected from the group consisting of Zn and Mg, and B is selected from the group consisting of Si and Ge.

In a preferred embodiment of the present invention, the temperature described above is 1180° C. or more.

In a preferred embodiment of the present invention, a ratio of a thickness of the phosphor to a length thereof is 1:1.5 or more.

In a preferred embodiment of the present invention, the phosphor has a half band width at $2\theta = 34°$ in a X-ray diffraction pattern set to be below 0.2.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
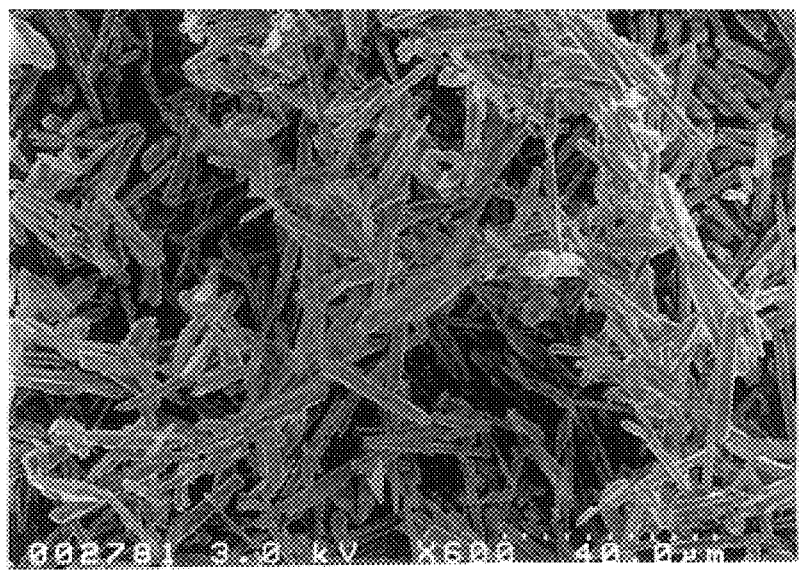
FIG. 1 is a photograph by a scanning electron microscope (SEM) (hereinafter referred to as "SEM photograph") showing a first embodiment of a GaN type phosphor according to the present invention.

Now, the present invention will be described with reference to the accompanying drawings.

In the present invention, a synthesizing temperature at which a phosphor represented by $Ga_{1-x}In_xN:A,B$ wherein x is larger than or equal to 0 and smaller than 1 ($0 \leq x < 1$), A is Zn or Mg, and B is Si or Ge is synthesized, is set to be above a conventional synthesizing temperature set in the prior art. More particularly, in the present invention, the synthesizing temperature is set to be equal to or above a sublimation temperature of a starting material or a doping material. This permits gas of a doping material to flow to a starting material which has been just melted, to thereby ensure that the doping material is fully diffused into the starting material. Concurrently, this permits a columnar crystal to grow on a surface of a sample, a low temperature portion of the sample and a surface of a seed material acting as a nucleus to growth. More specifically, this permits the starting material for a matrix to react with gas of the doping material when it is recrystallized after melting. Growth of a columnar crystal is considered to be monocrystal epitaxial growth, resulting in providing the crystal with highly satisfactory crystallizability or crystallinity.

The GaInN type columnar crystal thus prepared was applied to an indium-tin-oxide (ITO) substrate by suitable techniques such as printing, slurry coating or the like, to thereby form an anode, resulting in a fluorescent display device and a field emission type luminous device each of which has the anode incorporated therein being manufactured. As a result, it was found that the devices each having the powdery columnar or rod-like GaInN type phosphor of the present invention incorporated therein exhibit luminous efficiency 2 to 11 times as much as those having the conventional GaN type phosphor incorporated therein.

The invention will be understood more readily with reference to the following examples; however, these examples are intended to illustrate the invention and are not to be construed to limit the scope of the invention.

EXAMPLE 1

A GaN:Zn phosphor was prepared. To this end, $Ga_2O_3$ or $Ga_2S_3$ was used as a material for Ga. More specifically, 3 g of $Ga_2S_3$ was mixed with 0.6 g of ZnO to prepare a mixture, which was then carried on an alumina boat. Then, the mixture was heated to 1180° C. or more in a tubular oven for 3 hours while flowing ammonia at a flow rate of 350 ml/min therein. This permitted a white GaN powder to be produced on a surface of a sample and a low-temperature portion of a wall of the alumina boat which is positioned downstream of the gas.

The ammonia gas may be pure ammonia gas. However, it may be gas as disclosed in Japanese Patent Application No. 373539/1998. More particularly, it may contain gas which is selected from the group consisting of $H_2S$, $SO_2$, $O_2$, $O_3$, $N_2O$, NO air, $H_2O$, $CO_2$, CO and the like. Such mixed gas permits the product or phosphor to be increased in crystallinity.

The product thus obtained was observed by means of an SEM (scanning electron microscope). As a result, it was found that the product is formed of a columnar (or rod-like) crystal, as shown in FIG. 1. For comparison, an SEM photograph of a conventional particulate GaN:Zn phosphor of a round shape (particle size: about 1 $\mu$m) is shown in FIG. 2.

Then, the GaN phosphor in the form of a columnar crystal thus obtained was subjected to X-ray diffraction analysis. As a result, a diffraction pattern of GaN of a hexagonal system was obtained as. shown in FIG. 3. A half band width at $2\theta=34°$ of the conventional round particulate GaN:Zn phosphor shown in FIG. 2 was 0.22, whereas that of the columnar crystal GaN phosphor of the present invention was less than 0.2, resulting in crystallinity thereof being highly improved. Also, the columnar crystal GaN phosphor of the present invention had a ratio of thickness to length of 1:1.5 or more.

Figure 2:
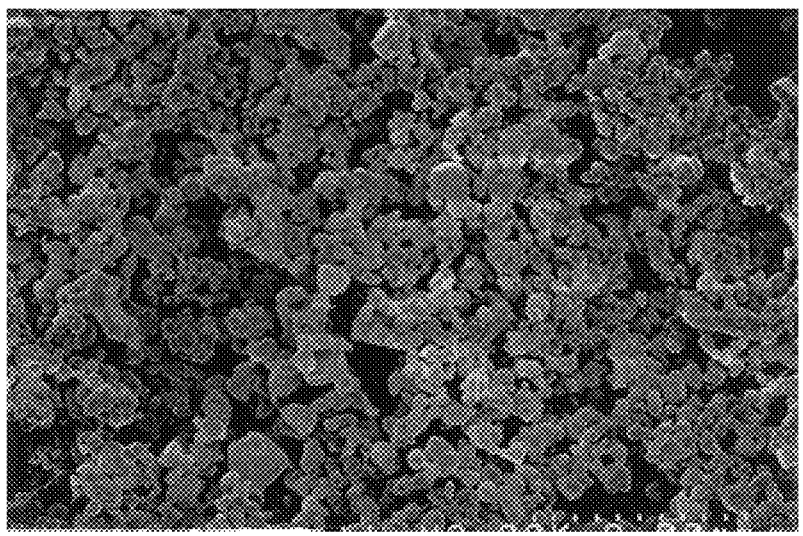
FIG. 2 is an SEM photograph showing a conventional GaN type phosphor.
Figure 3:
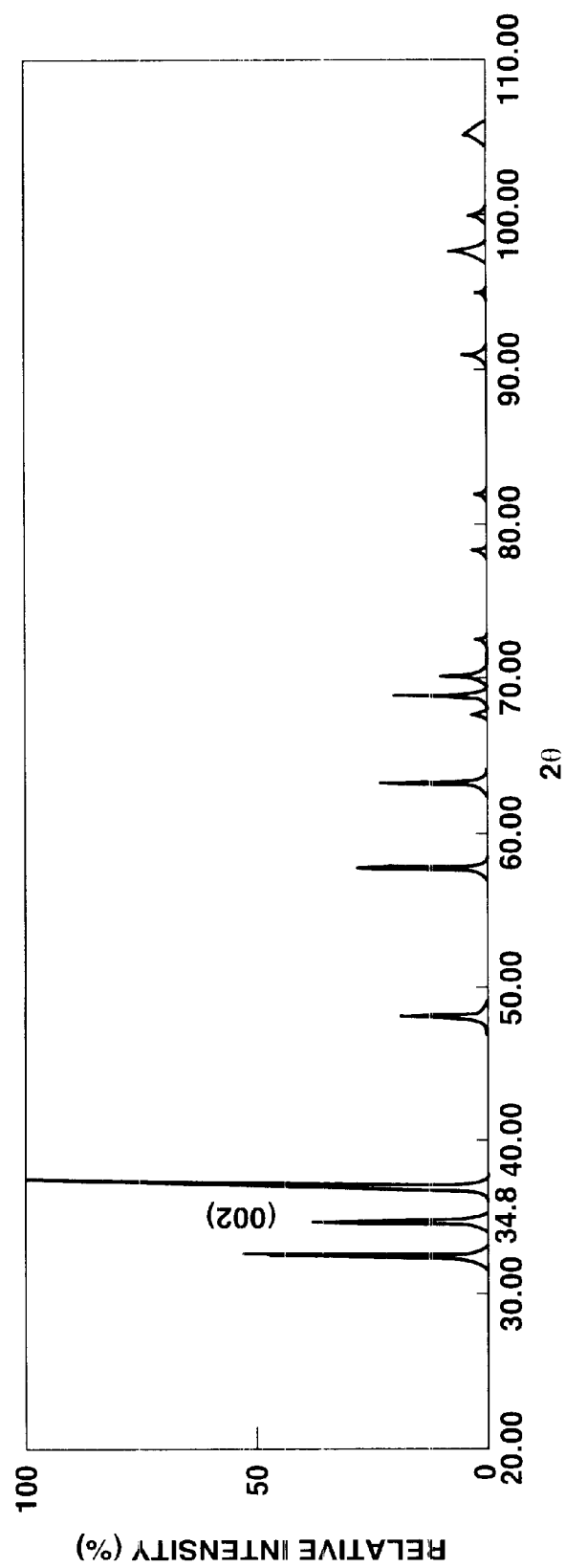
FIG. 3 is an X-ray diffraction pattern of the GaN type phosphor shown FIG. 1.
Figure 4:
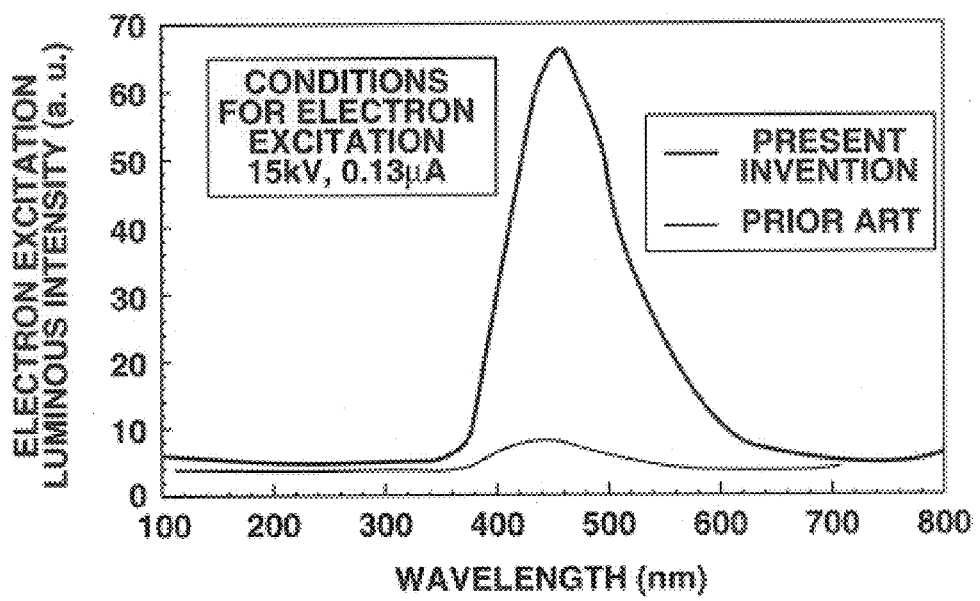
FIG. 4 is a graphical representation showing intensity of luminescence of the GaN type phosphor of FIG. 1 by electron excitation and that of the conventional GaN type phosphor of FIG. 2 thereby while comparing both with each other.
Figure 5:
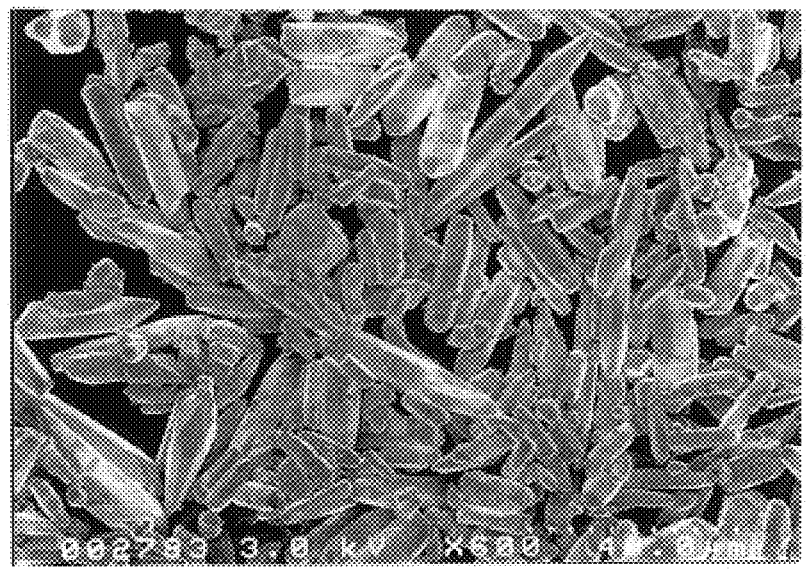
FIG. 5 is an SEM photograph showing a second embodiment of a GaN type phosphor according to the present invention.

Also, the conventional round particulate GaN:Zn phosphor shown in FIG. 2 and the columnar crystal GaN phosphor of the present invention were subjected to measurement of intensity of luminescence by electron excitation for comparison therebetween. The results were as shown in FIG. 4, which indicates that the phosphor of the present invention is blue in luminous color and has luminous intensity about 11 times as much as that of the conventional phosphor.

The example was practiced using the alumina boat, resulting in the columnar crystal GaN phosphor being formed on a part of the surface of the boat and sample. In this instance, employment of a manufacturing unit including a drum for stirring the starting material received therein while rotating it and a means for maintaining a desired reactive atmosphere in an interior of the drum permits the columnar crystal GaN phosphor to be formed on the whole sample.

EXAMPLE 2

To form $Ga_{1-x}In_xN:A,B$ wherein x is larger than or equal to 0 and smaller than 1 ($0 \leq x1$), A is Zn or Mg, B is Si or Ge, and has a composition ratio of x=0.8, 0.1% of $GeO_2$ acting as a donor was added to a material compounded to form a coprecipitant. Then, 0.2% of MgO was added to the coprecipitant to prepare a starting material. Only the starting material thus obtained was subjected to a reaction at 1180° C. for two hours in a stream of ammonia, to thereby obtain a $Ga_{1-x}In_xN:Mg,Ge$ phosphor.

It was found that an arrangement of a material selected from the group consisting of, for example, ZnS, $ZnSO_4$, ZnO, $ZnCO_3$, Mg, $MgSO_4$, $MaCO_3$ and the like, on an upstream side of the starting material permits the phosphor to be improved in crystallinity.

The phosphor obtained was subjected to observation by an SEM. As a result, it was found that the phosphor formed is a columnar (or rod-like) crystal of a hexagonal system. The phosphor of the example exhibited orange-colored luminescence and had luminous intensity substantially equal to that of the phosphor obtained in Example 1.

EXAMPLE 3

Metal Ga dissolved in nitric acid and Mg in an amount corresponding to 1 mol % were precipitated at a normal temperature by dropping of ammonia, to thereby obtain Mg-added gallium hydroxide. Then, sol-like $SiO_2$ obtained by hydrolysis of ethyl silicate was adhered to a surface of a sample, to prepare gallium hydroxide containing Mg and Si. Thereafter, the gallium hydroxide was carried on a boat for calcination, to thereby be subjected to a reaction at 110° C. for two hours in a stream of ammonia, resulting in powdery GaN:Mg,Si being obtained. An alumina powder acting as a nucleus for growth was placed in a low-temperature region on a downstream side of the GaN:Mg,Si and maintained at 1180° C. or more for five hours. As a result, growth of a fine crystal (recrystallization) was confirmed.

It was confirmed that a phosphor exhibiting a blue luminous color was obtained on the sample. The phosphor was identified to be GaN by x-ray diffraction. The material was then subjected to observation by an SEM. As a result, it was found that it is in the form of a columnar (or rod-like) crystal of a hexagonal system having a diameter of about 1 $\mu$m and a length of about 30 $\mu$m.

Figure 6:
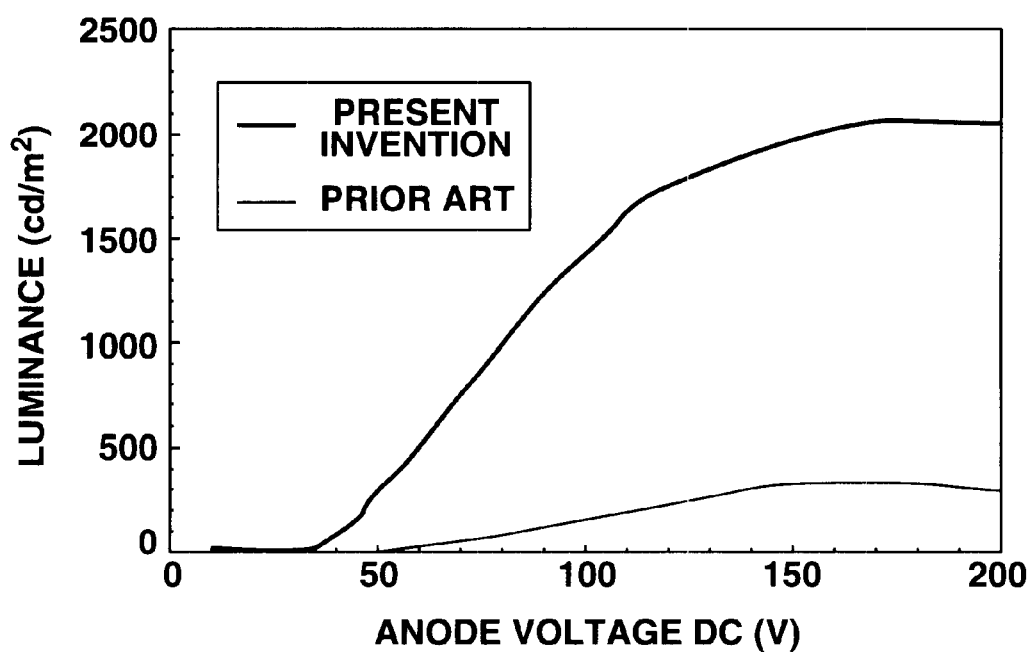
FIG. 6 is a graphical representation showing anode voltage luminance characteristics of a fluorescent display device having a third embodiment of a GaN type phosphor according to the present invention incorporated therein and that of a fluorescent display device having the conventional GaN phosphor incorporated therein while comparing both with each other.

The columnar crystal phosphor was pulverized by collision techniques, resulting in a powder of the phosphor which is cleaved by a length of about 5 $\mu$m being obtained. Then, the phosphor powder was used for manufacturing of a fluorescent display device, which was subjected to measurement of anode current voltage dependency of luminance. As a result, it was found that the fluorescent display device exhibits luminance about 6 times as much as the prior art as shown in FIG. 6. Then, life characteristics of the fluorescent display device was measured. As a result, luminance retention of the fluorescent display device after 500 hours was as high as about 96%. For comparison, luminance retention of the conventional fluorescent display device under the same conditions was about 90%. The phosphor of the example was coated on an ITO substrate to form an anode, which was arranged opposite to a cathode substrate formed thereon with a field-emission cathode, to thereby construct a field-emission type luminous device. The field-emission luminous device was then driven for luminescence under conditions that an anode voltage is set to be 600V and a duty ratio is 1/240, resulting in exhibiting luminous efficiency (0.41 m/W) 4 times as much as that of a conventional field-emission type luminous device.

EXAMPLE 4

A GaInN:Mg phosphor was prepared. 2 g of $Ga_2S_3$, 1 g of $In_2S_3$ and 0.4 g of $MgCl_2$ were fully mixed to prepare a mixture, which was then carried on a calcination boat. A sample was placed in a tubular oven as in Example 2, resulting in being subjected to calcination at 1180° C. for three hours while flowing ammonia at a rate of 350 ml/min, to thereby obtain a GaInN:Mg phosphor. Evaluation of the thus-prepared phosphor was carried out by mounting it in a fluorescent display device or a field emission-type luminous device. As a result, it was found that the phosphor exhibits a green luminous color and luminance about 5 times as much as the conventional particulate phosphor.

EXAMPLE 5

Metal Ga and In were placed in a low-temperature region of a tubular oven. ZnO acting as a dopant and powdery SiC acting as a nucleus for growth were contained therein. Then, the oven was heated at 1180° C. or more for 1 to 3 hours while flowing ammonia gas therein, to thereby vaporize the materials for synthesis by nitriding, resulting in a $Ga_{0.8}In_{0.2}N$:Zn phosphor in the form of a columnar crystal powder being formed on the SiC powder. Then, the thus-formed material was pulverized to a degree similar to cleavage, to thereby obtain a powder of about 7 μm in average length and about 2 μm in average thickness. Then, the thus-obtained phosphor of the present invention was mounted in a fluorescent display device for evaluation. It was found that the phosphor exhibits a green luminous color and luminance about 4 times as much as the conventional particulate phosphor.

In a technical field of production of an epitaxial film, dopants other than those described in the above examples are likewise known. Application of such dopants to the present invention permits the phosphor of the present invention to exhibit luminous colors other than those described above.

As can-be seen from the foregoing, the phosphor of the present invention represented by $Ga_{1-x}In_xN$:A,B wherein x is larger than or equal to 0 and smaller than 1 ($0 \leq x < 1$), A is Zn or Mg, and B is Si or Ge is prepared by heating the starting material to a temperature equal to or more than a sublimation temperature thereof. Such construction permits the phosphor to be improved in crystallinity, be increased in luminance characteristics and luminous efficiency, realize various luminous colors by electron excitation depending on selection of elements added thereto and be improved in life characteristics, resulting in contribution to a substantial improvement in performance of a fluorescent display device and a field emission luminous device.

While a preferred embodiment of the invention has been described with a certain degree of particularity with reference to the drawings and examples, obvious modifications and variations are possible in light of the above teachings. It is therefore to be understood that within the scope of the appended claims, the invention may be practiced other wise than as specifically described.

What is claimed is:

1. A phosphor comprising $Ga_{1-x}In_xN$:A,B, wherein x is larger than or equal to 0 and smaller than 1 ($0 \leq x < 1$), A is selected from the group consisting of Zn and Mg, B is selected from the group consisting of Si and Ge, and wherein said phosphor is a columnar powder produced by heating a starting material constituted by a GaN based phosphor material to a temperature equal to or greater than a sublimation temperature of the GaN based phosphor.

2. A phosphor as defined in claim 1, wherein said temperature is 1180° C. or more.

3. A phosphor as defined in claim 1, wherein a ratio of a thickness of said phosphor to a length thereof is 1:1.5 or more.

4. A phosphor as defined in claim 1, wherein said phosphor has a half band width at 2θ=34° in a X-ray diffraction pattern set to be below 0.2.

* * * * *